United States Patent [19]

Tan

[11] 4,122,484
[45] Oct. 24, 1978

[54] DISPLAY DEVICE FOR THREE-DIMENSIONAL TELEVISION

[75] Inventor: Sing Liong Tan, Eindhoven, Netherlands

[73] Assignee: U.S. Philips Corporation, New York, N.Y.

[21] Appl. No.: 730,004

[22] Filed: Oct. 6, 1976

[30] Foreign Application Priority Data

Oct. 16, 1975 [NL] Netherlands ............ 7512131

[51] Int. Cl.² ............ H04N 9/58; H04N 9/60
[52] U.S. Cl. ............ 358/3; 358/88
[58] Field of Search ............ 358/88, 89, 91, 92, 358/3; 352/61

[56] References Cited

U.S. PATENT DOCUMENTS

| | | | |
|---|---|---|---|
| 2,845,618 | 7/1958 | Huffman | 358/88 |
| 3,165,578 | 1/1965 | Lauricella | 358/91 |

FOREIGN PATENT DOCUMENTS 937,781  8/1948  France ............ 352/61

*Primary Examiner*—John C. Martin
*Attorney, Agent, or Firm*—Frank R. Trifari; Algy Tamoshunas

[57] ABSTRACT

A three-dimensional, black-white or color television display device which is compatible for two-dimensional television. Located in front of the screen of a direct-view display tube is a removable strip or dot filter having alternatingly light-reflecting and light-dispersing strips or dots and light-transmissive, polarizing or light-selecting strips or areas. The display device is provided with a projection display tube which gives with three-dimensional display an image on the strip or dot filter via a polarizer or light-selecting filter. By means of spectacles having polarized glasses or light-selecting glasses an observer can observe a three-dimensional image.

10 Claims, 5 Drawing Figures

DISPLAY DEVICE FOR THREE-DIMENSIONAL TELEVISION

The invention relates to a display device for three-dimensional television, provided with two display tubes for producing two images, with light-selecting means for making different light from the two images and with superposition means for forming a composite image from the two images.

United States Patent Specification No. 2,845,618 discloses such a display device. The display device comprises two picture display tubes, one of which is mounted with its axis horizontal and the other one with its axis vertical. Polarization sheets, each having a different direction of polarization are located in front of the two picture display tubes as light-selecting means for making the light different. Through a semi-transparent and semi-reflective mirror, which is mounted at an angle of 45° the composite image is formed from the two images, one image giving the information intended for the left eye of an observer and the other for the right eye. The observer is provided with a light analyser, for example spectacles with polarized glasses so that only the relevent eye receives the information intended for it.

The sizes of the disply device described, provided with two picture display tubes and the mirror of an angle of 45° are unacceptably large.

It is an object of the invention to realize a display device suitable for the display of both a three- and a two-dimensional image, the dimensions of the display device being acceptable at the same time. The display device according to the invention is therefore characterized in that the display device is provided with a projection display tube and a direct-view display tube, a strip or dot filter having alternatingly light-reflecting and dispersing strips or dots and light transmissive, polarizing or light-selecting strips or areas having been placed in front of the display screen of the direct-view display tube, the display device being provided with light projection means for giving the projection image produced by the projection display tube via a light polarizer or light-selecting filter on said strip or dot filter.

The invention will be further explained with reference to the following Figures by way of nonlimitative example, in which FIG. 1 shows a known pick-up and transmitting apparatus for three-dimensional television.

Figure 1:
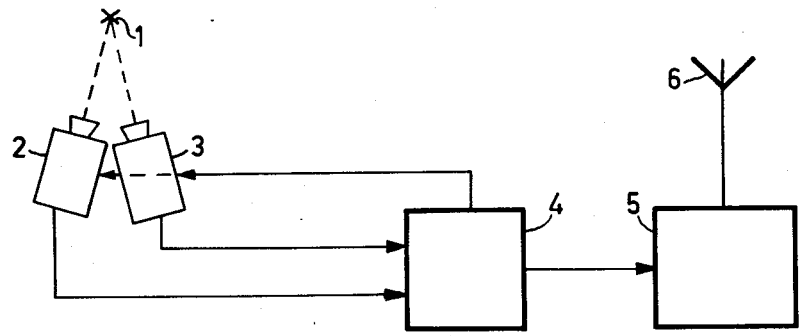
Figure 2:
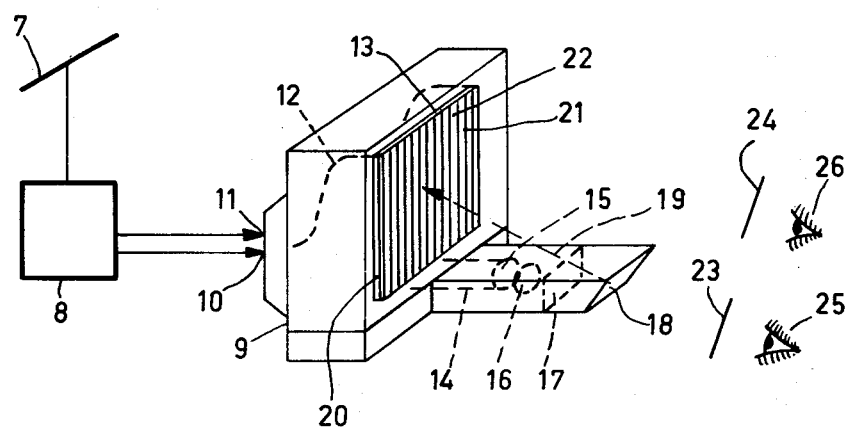
FIG. 2 shows a display device according to the invention suitable for use in black-white or colour television

FIG. 1 shows a construction of a pick-up and transmitting apparatus for three-dimensional television so that in the description of the construction of the display device according to FIG. 2 references can be made to FIG. 1 to simplify the explanation. A scene 1 is televised with two television cameras 2 and 3 which are aimed horizontally under a different angle of view at the scene 1. Herein the cameras 2 and 3 represent the eyes of an observer of the scene 1, for example the left and right eye respectively. The cameras 2 and 3 produce video signals which are applied to a signal processing device 4. The device 4 supplies control signals to the cameras 2 and 3 and processes the incoming video signals into a composite video signal for supply to a transmitting apparatus 5. The transmitting apparatus 5 is provided with a transmitting antenna 6.

Whether the cameras 2 and 3 are constructed as a black-white camera having one pick-up tube or pick-up panel or as a colour television camera having two or more pick-up tubes or -panels is not relevant to the invention. The same applies to the specific composition of the composite video signal which is applied to the transmitting apparatus 5.

Reference 7 in FIG. 7 indicates a receiving antenna, reference 8 a receiving device and reference 9 a display device according to the invention. The construction of the receiving device 8 is not relevant to the invention; what is relevant is that the video signal is applied to a first input 10 of the display device 9 which signal comes, for example, from television camera 2 and that the video signal which comes from the television camera 3 of FIG. 1 is applied to a second input 11.

Figure 4:
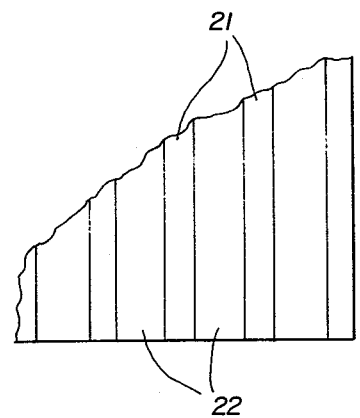
FIG. 4 shows a portion of the display screen employing strip filters.

The display device 9 is provided with a direct-view display tube 12, whose display screen is indicated by reference 13, and with a projection display tube 14 provided with a display screen 15. A projection lens 16 is arranged in front of the display screen 15. Reference 17 indicates either a light polarizer or light-selecting filter, depending on the construction opted for, which follows after the projection lens 16. For simplicity of the explanation of the operation of the display device 9 of FIG. 2 it is assumed that light polarisation is used, so the use of a light polarizer 17 will be described. The light polarizer 17 is followed by a reflecting mirror 18 which throws polarized light onto a strip filter 20 arranged in front of the display screen 13. The strip filter 20 is provided with narrow, light-reflecting and dispersing strips 21 which are mutually separated by wide, light-transmissive strips 22 (see FIG. 4) which polarize the light coming from the display screen 13. The direction of polarization of the light which is transmitted by polarizer 17 and which is reflected by the narrow strips 21 is transverse to the direction of polarization of the light which is transmitted by the wide strips 22 of the strip filter 20. It will be evident that also other manners of polarization may be used. The only aim is: making the light from the two images different. The result is that the image to be projected and which is present on the screen 15 of the projection display tube 14 produces, through a light projection means (16, 18) and the light polarizer 17, an image which is visible on the narrow, reflecting strips 21 whilst the image present on the display screen 13 can be observed through the wide strips 22. To be able to see the two images with differently polarized light an observer must use a light analyser (23, 24) which is constructed as a pair of spectacles having two differently polarized glasses 23 and 24. Reference 25 indicates the left and reference 26 the right eye of the observer who thus observes a composite image which gives a three-dimensional impression.

It is assumed that through the spectacle glass 23 the image on the display screen 13 can be observed through wide strips 22 whilst the direct-view displsy tube 12 is connected to the input 10 so that the video signal derived from the television camera 2 is applied to it. Through spectacle glass 24 the image projected on the narrow strips 21 can be observed, the projection display tube 14 being connected to the input 11 and the video signal derived from television camera 3 being applied to it. Should the strips 21 and 22 have been made equally wide then the share of both images in the composite image would be equally large. As, however, it generally applies that the definition of a projected image is not as good as on a display screen of a direct-view display tube a smaller width has been chosen for the reflecting strips 21 than for that of the light-transmissive strips 22. This results in the share of the image having the better resolution exceeding in the composite image that of the image whose resolution is not as good. For three-dimensional viewing it is perfectly acceptable that a composite image is formed from an image having a good sharpness and brightness and an image whose sharpness and brightness are not as good. It holds, by way of example, that the narrow strips 21 occupy not more than 30% of the surface area of the strip filter 20.

To use the display device 9 of FIG. 2 for displaying a two-dimensional image it is sufficient to remove the strip filter 20 and to ensure that the single video signal is applied to the direct-image display tube 12; in the above example through the lead to input 10. In this way a proper compatibility has been obtained for a two- and three-dimensional display. Removing the strip filter 20 can be effected in a simple manner by mounting it at the display device 9 in such a way that it can be turned away or pushed away so that for a two-dimensional display the strip filter 20 is stored within the display device 9. This solution is better than the use of a separate, attachable strip filter which may cause storage problems. Since the light projection means (16, 18) is not used with the two-dimensional display it may also be mounted on the display device 9 in such a way that it can be turned or pushed away.

Figure 5:
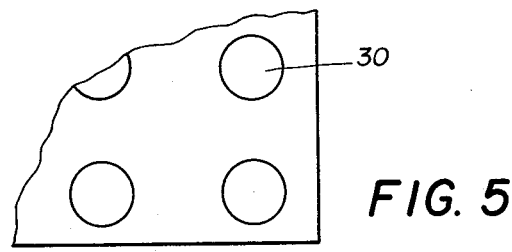
FIG. 5 shows a portion of the display screen employing a dot filter.

FIG. 2 shows, by way of example, the strip filter 20 with vertically extending strips 21 and 22. This solution is better than that with horizontally extending strips as the composition of the television picture by means of horizontal television lines together with the horizontal strip pattern may result in moire interferences Instead of a strip filter 20 thoughts may also go towards the use of a dot filter having light reflecting and dispersing dots 30, as seen in FIG. 5, and intermediate, light transmissive, polarizing areas 31. To obtain the same effect as that with the use of the narrow reflecting and wide light-transmissive strips the combined area of the reflecting dots must be smaller than half the entire surface of the dot filter; for example, 30% of the surface area.

Figure 3:
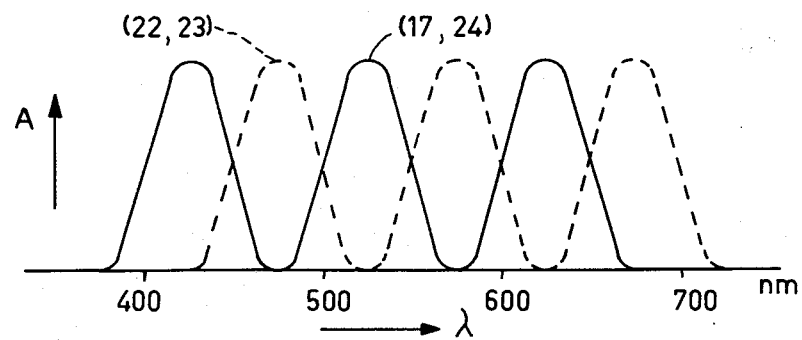
FIG. 3 shows response curves of light-selecting filters which are known per se.

In the description of the display device 9 of FIG. 2 it was assumed that for the composition and observation of the image at the display device 9 use is made of polarizing means such as the polarizer 17, the polarizing strips 22 of the strip filter 20 and the spectacle glasses 23 and 24 of polarized glass. Instead thereof, a light selecting filter 17, lightselecting strips or areas 22 of a strip or dot filter 20 and spectacle glasses 23 and 24 of lightselecting glass might be used with equal advantage. FIG. 3 shows two transmission characteristics 2, 23 and 27, 24 with such a light break-up in which the transmittance A is plotted versus the wave length π of light. From 400 to 700 nm the wave length λ has been plotted at which the colour of light changes from blue via yellow to red. When a scene of only white, otherwise uncoloured light is observed by an eye via a light-selecting filter having the characteristic 22,23 or 17, 24 the scene is also shown in white light. The difference is that the white light which is transmitted by the one and by the other filter is composed of other light components. This will cause the white light coming from a scene and which has been transmitted as specifically composed white light through a light-selecting filter having, for example, a transmission characteristic (22, 23 will be blocked by a subsequent light-selecting filter having the transmission characteristic 17, 24. Constructing the light-transmissive strip 22 and the spectacle glass 23 of FIG. 2 with the transmission characteristic 22, 23 of FIG. 3 and using the transmission characteristic 17, 24 for the light-selecting filter 17 and the spectacle glass 24 enables, as with the use of the polarization described above, a separate observation by the left eye 25 and the right eye 26 of the partial images of the composite image of the display device 9. The advantage of the use of light-selecting filters instand of polarizing filters, for making the light from the two images different, is that when an observer might turn his head no cross-talk occurs between the left and the right partial image. This cross-talk is also avoided when circular polarization is used.

What is claimed is:

1. In a dispaly device for three-dimensional television provided with two display tubes for producing two images, with light-selecting means for making the light from the two images different and with super-position means for forming a composite image from the two images; the improvement wherein the display device comprises a projection display tube and a direct-view display tube, a first filter having alternatingly light-reflecting and light-dispersing areas and light transmissive, light-selecting areas positioned in front of the display screen of the direct-view display tube, the display device including light projection means having a second light selecting filter for projecting the image produced by the projection display tube by way of the light-refleting and light-dispersing areas of said first filter.

2. A display device as claimed in claim 1, wherein the areas of first filter located in front of the display screen are strips that extend vertically.

3. A display device as claimed in claim 2, wherein the width of the light-reflecting and light-dispersing strips is smaller than that of the light-transmissive light-selecting strips.

4. A display device as claimed in claim 1, wherein the light-reflecting and light-dispersing areas of said first filter are dots having a total area smaller than half the entire surface area of the first filter.

5. A display device as claimed in claim 1, wherein said first filter extends substantialy parallel to the display screen of said direct-view display tube.

6. A display device as claimed in claim 5 wherein said light projection means is positioned to direct the display from said projection display tube on to the side of said first filter away from said direct-view display tube.

7. The display device of claim 6, wherein said projection display tube is mounted to project its image transversely of the plane of said first filter, and said light projection means includes mirror means positioned to direct the image of said projection display tube o sid side of said first filter.

8. The display device as claimed in claim 1 wherein said light transmissive areas of said first filter and said second filter are light polarizing.

9. The display device of claim 1 wherein said light transmissive areas of said first filter and said second filter are color selective.

10. The display device of claim 1 wherein each of said light transmissive areas of said first filter and said second filter are light transmissive to different sets of colors, whereby the images from said tubes may be viewed as black and white images.

* * * * *